(No Model.)
C. A. SWEARINGEN.
CULTIVATOR.
No. 387,751. Patented Aug. 14, 1888.
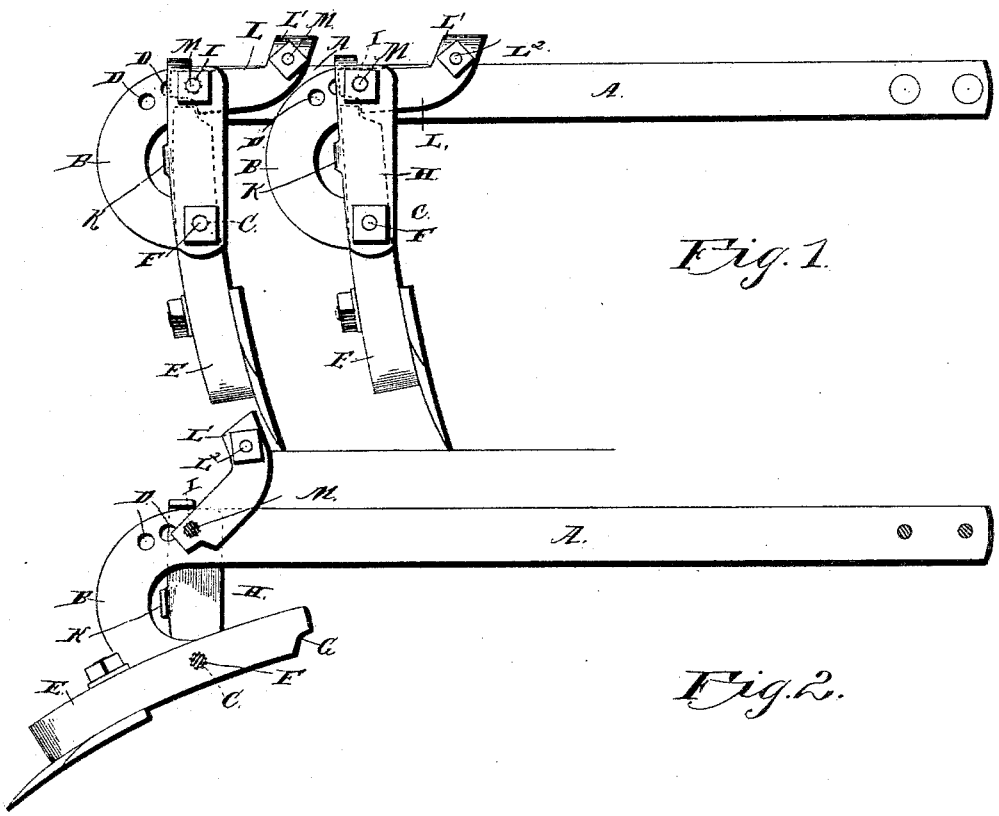
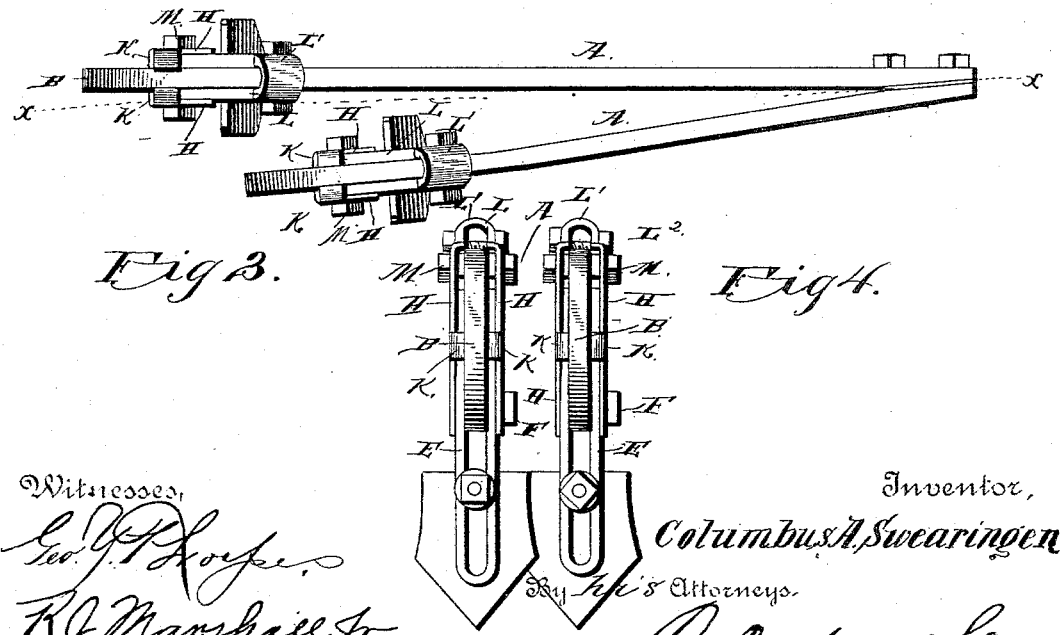
Witnesses,
Geo. J. Rose
R. J. Marshall Jr.
Inventor,
Columbus A. Swearingen
By his Attorneys.

UNITED STATES PATENT OFFICE.

COLUMBUS ALEXANDER SWEARINGEN, OF LAMPASAS, TEXAS.

CULTIVATOR.

SPECIFICATION forming part of Letters Patent No. 387,751, dated August 14, 1888

Application filed April 19, 1888. Serial No. 271,137. (No model.)

*To all whom it may concern:*

Be it known that I, COLUMBUS ALEXANDER SWEARINGEN, a citizen of the United States, residing at Lampasas, in the county of Lampasas and State of Texas, have invented a new and useful Improvement in Cultivators, of which the following is a specification.

My invention relates to an improvement in cultivators; and it consists in the peculiar construction and combination of devices, that will be more particularly set forth hereinafter, and particularly pointed out in the claims.

In the accompanying drawings, Figure 1 is a side elevation of a cultivator embodying my improvements. Fig. 2 is a sectional view of the same, showing one of the cultivator-plows in position when released to pass an obstruction, on the line $x\ x$ of Fig. 3. Fig. 3 is a top plan view. Fig. 4 is a rear elevation.

A represents a pair of rearwardly-diverging beams of the usual construction, which have their rear ends curved downward to form arms B. In the lower ends of the arms are openings C, and the rear portions of the beams are provided with a series of openings, D, which are concentric with said openings C.

E represents U-shaped cultivator standards or feet, which are pivoted to the lower ends of the arms by means of bolts F, the said bolts extending through the openings C of the arms and through aligned openings in the sides of the standards. The upper ends of the standards engage opposite sides of the rear portion of the beams, as shown, and are provided in their front corners with notches G.

H represents side plates, which are arranged on opposite sides of each of the standards, have their lower ends pivoted on the pivotal bolts of said standards, are provided at their upper ends with openings I, which are adapted to register with a series of openings, D, at the rear ends of the beams, and have their rear sides provided with inwardly-extending ears K, which are adapted to bear against the rear sides of the standards.

L represents a pair of triggers, one of which is provided for each beam. Said triggers are each bent from a single piece of metal, and are thereby U-shaped in cross-section, and are adapted to ride over the beams, as shown. The rear ends of the said triggers are provided with aligned openings, which are adapted to register with either of the openings D, according to the inclination at which it is desired to operate the standards, and a bolt, M, passes through the said openings in each trigger, through one of the openings in each beam, and through the openings I at the upper ends of the plates H, thereby pivoting the said trigger to the beam and securing the upper ends of the plates H rigidly in position. The front ends of the triggers curve upward and form yokes L', which embrace the beams, and through said yokes extend bolts L², which are adapted to clamp the free ends of the triggers to the beams with any desired degree of firmness, so as to prevent the triggers from releasing the standard too easily.

Suitable plows or shovels are secured to the lower ends of the standards.

The operation of my invention is as follows: When the standards are in position to cause the plows or shovels to operate in the ground, the rear sides of the said standards come in contact with the ears on the rear sides of the plates H, the latter serving to determine the inclination at which the standards shall work. The triggers are then pressed downward by the foot of the operator, and their rear lower corners are caused to engage recesses or notches G in the upper ends of the standards, said triggers thereby serving to maintain the standards at the correct inclination. When the plow or cultivator is in operation and one of its shares or shovels comes in contact with an inflexible obstacle, such as a stump or stone, the rearward strain on the lower end of its standard causes the upper end of the latter to move forward, and thereby throw the trigger upward and out of the way, and consequently the share or shovel is permitted to ride over the obstruction without injury to the plow.

Having thus described my invention, I claim—

1. The combination of the beams having the arms B, the standards pivoted to the lower ends of the said arms, the plates H, having their lower ends secured on the pivotal bolt of the standards and provided with the flanges or ears on the rear side, for the purpose set forth, and the triggers pivoted on the beams and adapted to be adjusted longitudinally thereon and to engage the upper ends of the standards, for the purpose set forth, the upper ends of the plate H being secured on the pivotal bolts of the triggers, substantially as described.

2. The combination of the beams having the arms B, provided with the openings C, the beams having openings D concentric with openings C, the standards, the bolts pivoting the latter to the arms and extending through the openings C, the plates having their lower ends secured on said pivotal bolts and adapted to engage the rear sides of the standards, the triggers, and the bolts to pivot the said triggers to the beams, said bolts being adapted to pass through either of the openings D, the upper ends of the plates H being secured on the said pivotal bolts, substantially as described.

In testimony that I claim the foregoing as my own I have hereto affixed my signature in presence of two witnesses.

COLUMBUS ALEXANDER SWEARINGEN.

Witnesses:
JAS. W. MOORE,
G. F. SHATTUCK.